(12) United States Patent
Fu et al.

(10) Patent No.: US 11,845,295 B2
(45) Date of Patent: Dec. 19, 2023

(54) PRINTABLE MEDIUM

(71) Applicant: Hewlett-Packard Development Company, L.P., Spring, TX (US)

(72) Inventors: Xulong Fu, San Diego, CA (US); Xiaoqi Zhou, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 554 days.

(21) Appl. No.: 16/323,041

(22) PCT Filed: Jan. 17, 2017

(86) PCT No.: PCT/US2017/013742
§ 371 (c)(1),
(2) Date: Feb. 4, 2019

(87) PCT Pub. No.: WO2018/136034
PCT Pub. Date: Jul. 26, 2018

(65) Prior Publication Data
US 2019/0168527 A1     Jun. 6, 2019

(51) Int. Cl.
*B41M 5/50* (2006.01)
*B41M 5/52* (2006.01)

(52) U.S. Cl.
CPC ............ *B41M 5/506* (2013.01); *B41M 5/502* (2013.01); *B41M 5/504* (2013.01); *B41M 5/508* (2013.01); *B41M 5/52* (2013.01); *B41M 5/5245* (2013.01); *B41M 5/5218* (2013.01); *B41M 5/5254* (2013.01)

(58) Field of Classification Search
CPC .. B41M 5/502; B41M 5/5245; B41M 7/0036; B41J 2/01

USPC ...................................................... 428/32.24
See application file for complete search history.

(56) References Cited

U.S. PATENT DOCUMENTS

| 7,132,142 | B2 | 11/2006 | Truog et al. |
| 8,652,617 | B2 | 2/2014 | Riebel et al. |
| 2003/0174195 | A1 | 9/2003 | Onishi et al. |
| 2007/0275617 | A1 | 11/2007 | Harris et al. |

(Continued)

FOREIGN PATENT DOCUMENTS

| CN | 1388008 | 1/2003 |
| CN | 101122164 | 2/2008 |

(Continued)

OTHER PUBLICATIONS

Locron P—Archroma—Datesheet (Year: 2018).*

(Continued)

*Primary Examiner* — Betelhem Shewareged
(74) *Attorney, Agent, or Firm* — HP Inc. Patent Department

(57) ABSTRACT

A printable medium with a non-woven base composite supporting substrate; at least two coating layers, on the image side of the composite supporting substrate, that include an ink fixing layer, directly applied upon the supporting substrate, comprising a salt; and an image receiving layer, applied over the ink fixing layer, including pigment fillers and polymeric binders; and a barrier layer, containing a flame-retardant agent, applied on the backside of the composite supporting substrate. Also disclosed are the method for producing printed images using said media and the resulting printed material.

20 Claims, 2 Drawing Sheets

(56) References Cited

U.S. PATENT DOCUMENTS

| | | | | |
|---|---|---|---|---|
| 2009/0035489 | A1* | 2/2009 | Kaimoto | B41M 5/502 428/32.1 |
| 2011/0250368 | A1 | 10/2011 | Shih et al. | |
| 2012/0026040 | A1 | 2/2012 | Hohne et al. | |
| 2012/0264040 | A1* | 10/2012 | Wu | C09D 11/34 430/14 |
| 2014/0132661 | A1* | 5/2014 | Inumaru | B41J 2/2107 347/21 |
| 2016/0152060 | A1 | 6/2016 | Zhou et al. | |

FOREIGN PATENT DOCUMENTS

| | | | |
|---|---|---|---|
| CN | 102229739 | 11/2011 | |
| CN | 102732100 | 10/2012 | |
| CN | 103124776 | 5/2013 | |
| CN | 103442898 | 12/2013 | |
| CN | 103796840 | 5/2014 | |
| CN | 104339911 | 2/2015 | |
| CN | 104507700 | 4/2015 | |
| CN | 105705339 | 6/2016 | |
| CN | 106149465 | 11/2016 | |
| JP | H07242052 | 9/1995 | |
| JP | 2001079974 | 3/2001 | |
| WO | 2007026939 | 3/2007 | |
| WO | 2010147468 | 12/2010 | |
| WO | 2013012481 | 1/2013 | |
| WO | WO-2015009271 A1 * | 1/2015 | B32B 7/12 |
| WO | 2016122485 | 8/2016 | |

OTHER PUBLICATIONS

International Search Report dated Sep. 28, 2017 for PCT/US2017/013742, Applicant Hewlett-Packard Development Company, L.P.

* cited by examiner

PRINTABLE MEDIUM

BACKGROUND

Inkjet printing technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of medium substrates. Inkjet printing technology has found various applications on different substrates including, for examples, cellulose paper, metal, plastic, fabric, and the like. The substrate plays a key role in the overall image quality and permanence of the printed images.

Large format print media becomes more and more popular and finds use in many applications such as wall-coverings, banners, and signs of many types that can be printed to create images with one or more symbols, text and photographs. When printing on such substrates, challenges exist due to their specific nature. Accordingly, investigations continue into developing printable media that can be effectively used for large format printing and/or for wall-coverings and which impart good printing performances.

BRIEF DESCRIPTION OF THE DRAWING

The drawings illustrate various examples of the present printable medium and are part of the specification.

DETAILED DESCRIPTION

Figure 1:
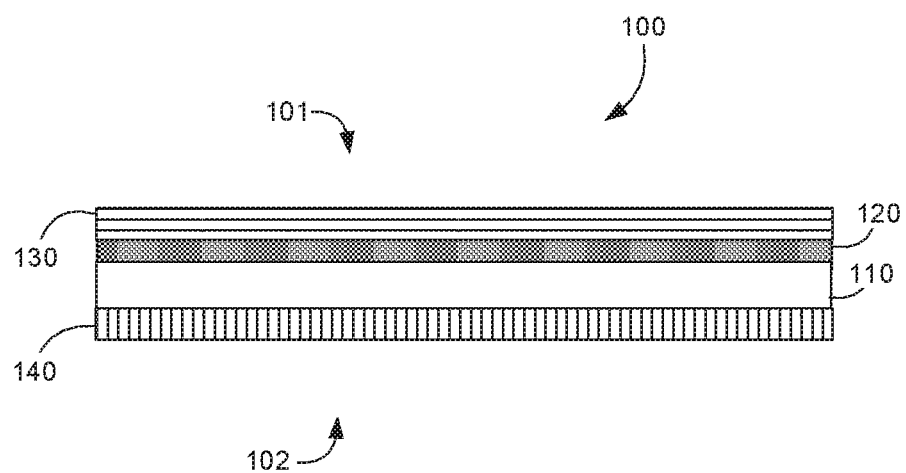
FIG. 1 is a cross-sectional view of the printable medium according to examples of the present disclosure.

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percentages are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The present disclosure refers to a printable medium with a non-woven base composite supporting substrate; at least two coating layers, on the image side of the composite supporting substrate, that include an ink fixing layer, directly applied upon the supporting substrate, comprising a salt; and an image receiving layer, applied over the ink fixing layer, including pigment fillers and polymeric binders; and a barrier layer, containing a flame-retardant agent, applied on the backside of the composite supporting substrate.

The printable medium, as disclosed herein, can be used as a wall-covering material (e.g., wallpaper) for home or commercial use, for decoration or display as well as signs or banners and the like. In some examples, the printable medium of the present disclosure is a wall-covering medium. In some other examples, the printable medium is a wall-covering medium with a non-woven base composite supporting substrate. The supporting substrate forms a non-image side and an image side on the printable medium. The non-image side, or backside, is the side that would face and attach to a wall, in a wall-covering application, or even in a sign or banner application having a single image side. The image side is the side that includes material layers to receive, support and protect an image.

The term "wall-covering," as used herein, means a large format print medium that has a length that is much larger than a width (or vice versa) relative to small format office paper or photo media products (e.g., letter, A4, legal, etc. sizes). For example, the wall-covering may be provided in a roll that is 1.37 meters (54 inches) wide and 27.43 meters (30 linear yards) long. Moreover, the term "wall-covering" means a print medium that supports various imaging materials and applications, for example, various types of inkjet inks and inkjet printing, for image formation, including digital printing. In addition, the term "wall-covering" means a product that complies with federal and industry standards or specifications for wall-coverings including, but may not be limited to, CCC-W-408A and D, ASTM F793 and CFFAW-101D. Under these standards, wall-coverings have weight and durability requirements depending on which category or type that the wall-covering falls within. Category I is for decorative only wall-covering, while Category VI is for commercial serviceability wall-covering. (Types I, II and III wall-coverings are substantially equivalent to Categories, IV, V and VI, respectively, among the standards). The wall-covering according to the principles described herein has wear and tear durability of Type-II, or possibly higher grade, wall-coverings in accordance with the aforementioned standards and may meet or exceed established criteria for Type-II wall-coverings under the aforementioned standards. Herein, the term "wall-covering," "wall-covering print medium," and "wall-covering digital print medium" may be used interchangeably.

In some examples, the printable medium of the present disclosure, when used a wall-covering, have a durability that may meet or exceed Type-II, commercial serviceability wall-covering standards or specifications, to provide a durable Type-II wall-covering that is also free of polyvinyl chloride (PVC), which is harmful to the environment. In some other examples, the printable medium, when used a wall-covering in an in-door environmental, is able to meet "Fire Resistance or flame resistance" standards such as ASTM E84 for example. In some examples, the printable medium of the present disclosure, shows fast ink absorption speed while readily fixing the colorants onto the media surface. The wall-covering material has fast drying, low degree of ink bleed, and low degree smear during high speed printing. The printed material as described herein also demonstrates excellent water and scratch resistance due to the use of the overcoat during wallpaper installation. The printable medium can be an inkjet printable medium. The printable medium can thus be specifically designed to receive any inkjet printable ink, such as, for example, organic solvent-based inkjet inks or aqueous-based inkjet inks. Examples of inkjet inks that may be deposited, established, or otherwise printed on the printable medium, include pigment-based inkjet inks, pigmented latex-based inkjet inks, and UV curable inkjet inks.

Figure 2:
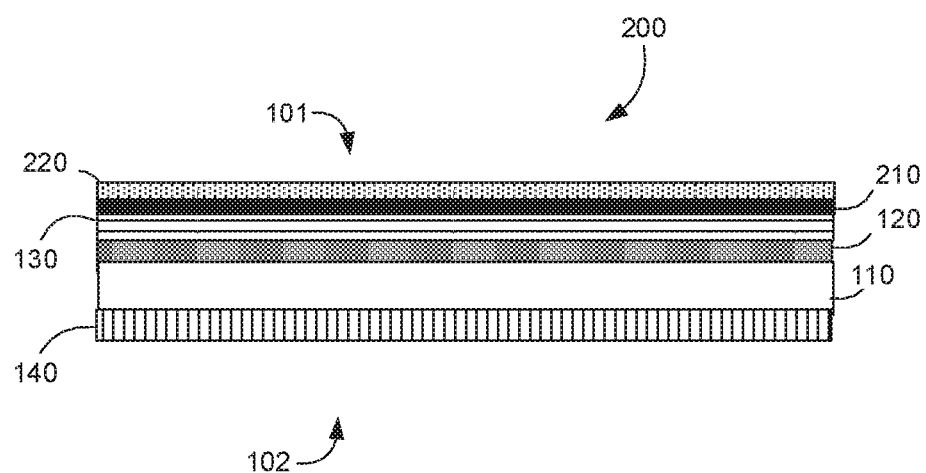
FIG. 2 is a cross-sectional view of a printed material according to examples of the present disclosure.
Figure 3:
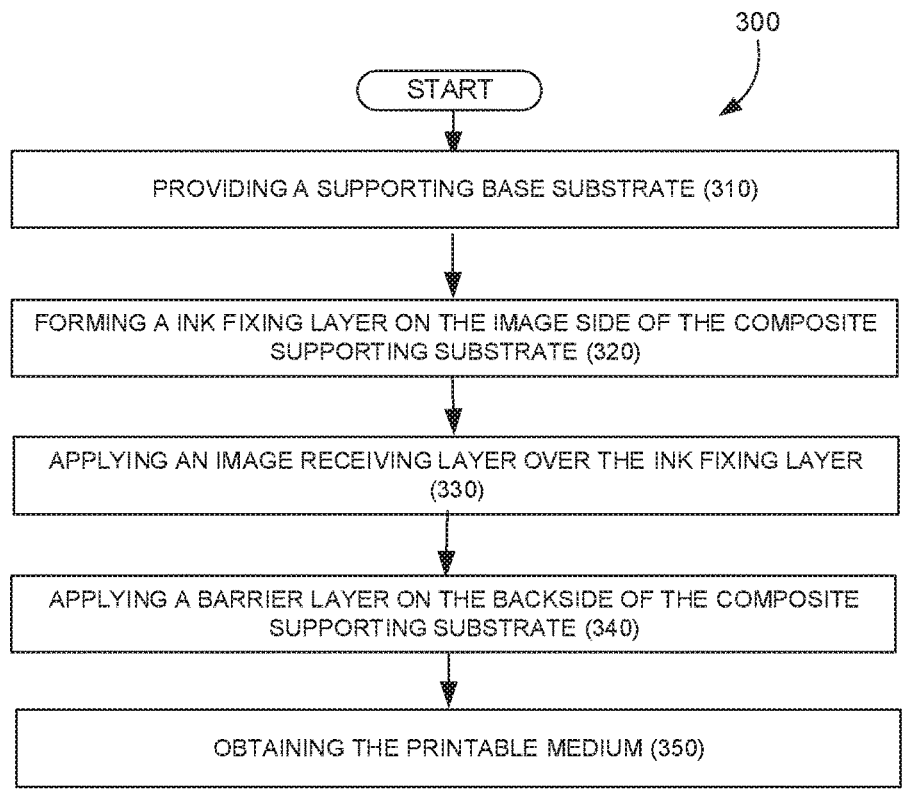
FIG. 3 is a flowchart illustrating the method for making the printable medium according to some examples of the present disclosure.
Figure 4:
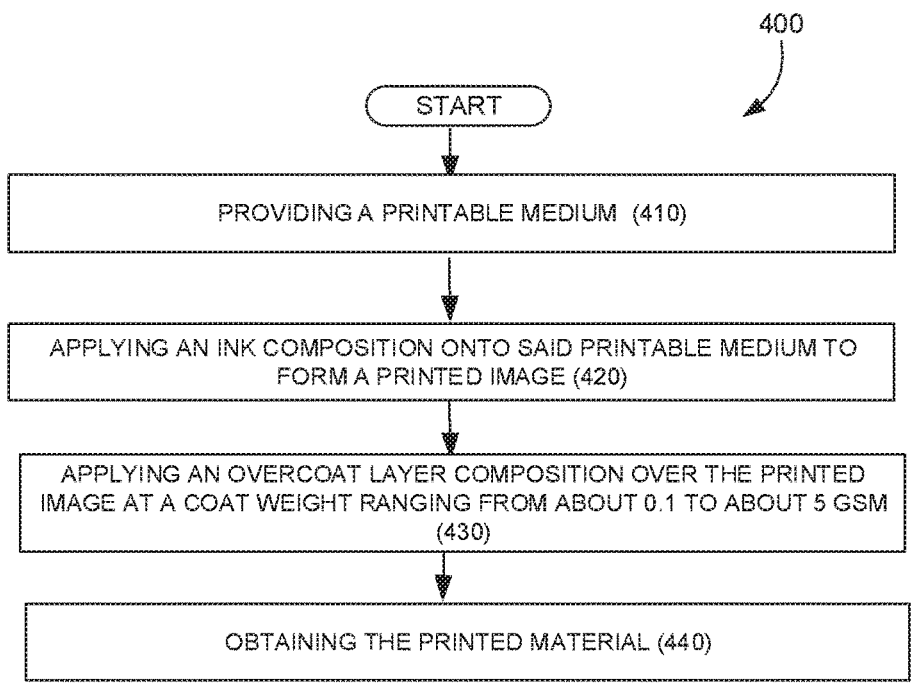
FIG. 4 is a flowchart illustrating a printing method for making the printed material according to some examples of the present disclosure.

FIG. 1 schematically illustrates an example of a printable medium 100 of the present disclosure. It is to be understood that the thickness of the various layers is exaggerated for illustrative purposes. The printable recording medium 100 has an image or printed side 101 and a backside or opposing side 102. The image side 101 of the medium is the side that includes material layers that will receive, support and protect an image. The backside, or opposing side, 102 is not designed for receiving printing image and is the side that would face and attach to a subject such as a panel, a board and a wall surface in a wall-covering application, or even in a sign or banner application having a single image side. As illustrated in FIG. 1, the printable recording medium 100 encompasses a non-woven composite supporting substrate 110, above which is applied, on the image side 101, an ink fixing layer 120. An image receiving layer with 130 is applied over said ink fixing layer 120. The image receiving layer 130 and the ink fixing layer 120 are applied, only, on one side of the supporting substrate 110. On the other side, i.e. backside or opposing side, of the composite supporting substrate 110, a barrier layer 140 is applied. FIG. 2 schematically illustrates an example of a printed material 200 of the present disclosure. The printed material 200 encompasses the printable recording medium 100 as described above, a printed image (210) applied on the image side 101 of the printable recording medium (i.e. over the image receiving layer 130) and overcoat layer (220) applied over the printed image (210). FIG. 3 is a flowchart illustrating a method for making the printable recording medium such as described herein. Such method encompasses providing a composite supporting substrate 310; forming an ink fixing layer 320 on the image side 101 of the supporting substrate; applying an image receiving layer 330 over said ink fixing layer 120; applying a barrier layer 340 on the backside 101 of the supporting substrate and, then, obtaining the printable medium 350. FIG. 4 is a flowchart illustrating a printing method comprising providing 410 a printable medium such as defined herein, applying an ink composition onto said printable medium to form a printed image 420; applying an over print durable overcoat layer applied over the printed image at a coat weight ranging from about 0.1 to about 5 gsm 430 and then obtaining the printed material 440.

The Printable Medium 100

The printable medium has a non-woven base composite supporting substrate 110, or non-woven base composite base substrate, having, on its image side 101, an ink fixing layer 120 and an image receiving layer 130, and having, on its back-side 102, a barrier layer 140.

The Supporting Substrate 110

The printable medium encompasses a supporting substrate or base substrate 110 that has an image side 101 and a back side 102. Such substrate is a composite supporting core substrate. The word "supporting" refers herein to a substrate where the printing image can be formed on at least one side of the substrate, i.e. the image side 101, via an image receiving coating deposited on the surface of the support. The word "supporting" also refers to a physical objective of the substrate which is to carry the image with any desired geometry and size with excellent durability or mechanical strength. The word "composite" refers herein to a material made from at least two constituent materials, or layers, that have different physical and/or chemical properties from one another, and wherein these constituent materials/layers remain separate at a molecular level and distinct within the structure of the composite. The composite supporting substrate can be made using paper making equipment. In some examples, the supporting substrate of the present disclosure encompasses at least two different constituent materials: a first constituent material and a second constituent material.

The supporting substrate is a non-woven supporting substrate. By "non-woven", it is meant herein that the fiber composition that are used form the supporting substrate have a non-woven structure. The base substrate includes a plurality of fibers or filaments that are one or both of bonded together and interlocked together by a chemical treatment process (e.g., a solvent treatment), a mechanical treatment process (e.g., embossing), a thermal treatment process, or a combination of two or more of these processes.

The first constituent material, of the supporting substrate 110, can be a synthetic polymeric fiber. Such synthetic polymeric fiber has an average length within the range of about 0.5 millimeter (mm) to about 8 mm. In some examples, the synthetic polymeric fiber has a length greater than 6 mm, provided that the synthetic polymeric fiber does not negatively impact the formation of the composite supporting core using the paper making equipment, for example on a screen of a paper mill. In some other examples, the synthetic polymeric fiber has diameter within the range of about 10 micrometers or microns ($\mu m$) to about 60 $\mu m$ with an average length within the range of about 2 mm and about 4 mm. The amount of the synthetic polymeric fiber, in the composite supporting core, depends on the length of the fiber. For instance, the use of longer synthetic fibers may allow for improvement in dimensional stability of the composite structure with lower amounts of the synthetic polymeric fibers being used. In some examples, the first constituent material is non-woven fiber structure that comprises synthetic fiber within a range of about 5% to about 40% by weight of total fiber.

The second constituent material, of the supporting substrate, can be a natural fiber. The natural fiber includes natural cellulose fiber from either hardwood species or hardwood species and softwood species. In some examples, a ratio of hardwood fiber to softwood fiber is within a range of about 100:0 to about 50:50. The natural cellulose fiber may be processed into various pulps including, but not limited to, wood-free pulp (such as bleached or unbleached Kraft chemical pulp and bleached or unbleached sulfite chemical pulp); wood-containing pulp (such as one or more of ground-wood pulp, thereto-mechanical pulp, and chemo-thereto-mechanical pulp); pulp of non-wood natural fiber (such as one or more of bamboo fiber, bagasse fiber, recycled fiber, cotton fiber); a combination of two or more of these pulps, or a mixture of two or more of these pulps.

In some examples, the supporting substrate contains a non-woven synthetic polymeric fiber as a first constituent material and a natural fiber as a second constituent material. The amount of synthetic polymeric fiber, in the supporting substrate, can be within a range of about 5 wt % to about 50 wt % by weight of total fibers in the supporting substrate; or, can be within a range of about 10 wt % to about 30 wt %.

The fiber layer of the composite supporting substrate 110 may comprise a PVC-free synthetic polymeric component that is one of synthetic polymeric material in a non-woven structure and a synthetic polymeric fiber network with nature fibers such as wood fibers. In some examples, the synthetic polymeric material can be selected from the group consisting of polyolefins, polyamides, polyesters, polyurethanes, polycarbonates, polyacrylics, a combination of two or more of the fibers, and a mixture of two or more of the fibers. The synthetic polyolefin fiber may include, but is not limited to, polyethylene fiber, polyethylene copolymer fiber, polypropylene fiber, polypropylene copolymer fiber, a combination of two or more of the polyolefin fibers, a combination of any of the polyolefin fibers with another polymeric fiber, mixtures of two or more of the polyolefin fibers, or mixtures of any of the polyolefin fibers with another polymer fiber. In some examples, the fiber layer may include a synthetic cellulosic material including, but not limited to, cellulose diacetate, cellulose triacetate, cellulose propionate, cellulose butyrate, cellulose acetate butyrate and nitrocellulose.

The supporting substrate may further contain a polymeric binder. The polymeric binder may be pre-mixed with one, or both, of the synthetic polymeric fiber and the natural fiber. Examples of polymeric binder include, but are not limited to, water soluble polymers, such as polyvinyl alcohol, starch derivatives, gelatin, cellulose derivatives, acrylamide polymers; water-dispersible polymers, such as acrylic polymers or copolymers, vinyl acetate latex, polyesters, vinylidene chloride latex, and styrene-butadiene or acrylonitrile-butadiene copolymer latex. The polymeric binder can also be a combination of two or more of the above polymeric binders; or a mixture of two or more of the above polymeric binders. The polymeric binder may have a glass transition temperature (Tg) within a range of about −30° C. to about 10° C. The Tg of the polymeric binder can also be within a range of −20° C. to about 10° C. or −10° C. to about 10° C. In some examples, the ratio of polymeric binder to the natural cellulose fiber, in the supporting substrate, is in the range of about 1:20 to about 1:1, or, in some other examples, in the range of about 1:10 to about 1:1, or, in yet some other examples, in the range of about 1:5 to about 1:1.

Moreover, the supporting substrate may further contain aqueous coupling agents in view of improving binding between the fibers. Representative examples of commercially available coupling agents include, but are not limited to, Dow Corning® Z 6032, Dow Corning® Z 6030, and Dow Corning® Z 6040 silanes (from Dow Corning, Inc., MI, USA), or Struktol® SCA 98, Struktol® SCA 930, and Struktol® SCA 960 organosilanes (from Struktol Company of America, OH, USA).

The supporting substrate may further include inorganic compounds on the form of particles with various morphologies. The average particle size of the inorganic compounds is within the range of about 0.05 to 12 about micrometers (μm), or within the range of about 0.1 to about 1.5 μm. The materials that can be used as inorganic powder include, but are not limited to, carbonates like grounded calcium carbonate, precipitated calcium carbonate, clays, titanium dioxide, hydrated alumina (e.g. aluminum trihydrate), barium sulfate, alumina, zinc oxide, and/or combinations thereof. The total weight percentage of inorganic compounds is between 2% to 25 wt % of the supporting substrate.

The supporting substrate can be a single sheet having different constituent materials. In some examples, the supporting substrate is a lamination of multiple sheets which contains multiple constituents via an adhesive. The adhesive can be selected from any materials having good adhesion property to the support sheets. Example of such adhesives include, but are not limited to, acrylic latex, polyurethane latex, polyethylene-acetate copolymer latex, epoxy latex and various rubber latex.

The supporting substrate can contain polymeric fiber and can be made in a fourdrinier type paper machine. The polymeric fiber can be first cut to the desired length, and premixed with binder, then added to the wood fiber in pre-determined ratio. The final fiber mixture containing both natural wood fiber and polymeric fiber can be diluted to about 1% concentration. In some instance, the diluted fiber mix is pumped through paper machine head-box and forms a sheet on an endless forming wire to drain the water, and is dried by both mechanical press and hot dry can. The final moisture can be of around 5%. The polymeric fiber containing substrate can be optionally calendered on line or off-line to reach desired smoothness.

The Ink Fixing Layer 120

The printable medium encompasses an ink fixing layer or ink fixation layer 120 that is directly applied above the supporting substrate 110, on the image side 101 of the printable medium. The ink fixing layer 120 is sandwiched between the top image receiving layer 130 and the supporting substrate 110. In some examples, the coat weight of the ink fixing layer 120 of the printable medium is within a range of about 0.1 gsm to about 25 gsm or from about 1 to 10 gsm. The thickness of the ink fixing layer 120 may range from about 0.001 nanometer to about 100 nanometers out of the top surface of the supporting substrate.

The ink fixing layer 120 contains a salt. The slat can be organic or inorganic. In some other examples, the salt of the ink fixing layer is an organic acid salt. In yet some other examples, the salt of the ink fixing layer is a water-soluble organic acid salt. Non-limiting examples of water-soluble organic acid salts include inorganic cation acetate, inorganic cation propionate, inorganic cation formate, inorganic cation oxalate, and the like. The organic salt refers to associated complex ion that is an organic specifies, where cations may or may not be the same as inorganic salt like metallic cations. Examples of water soluble organic acid salts include metallic acetate, metallic propionate, metallic formate, metallic oxalate, and the like.

In some examples, the ink fixing layer 120 contains salts that are calcium acetate, magnesium acetate or calcium propionate. In some other examples, the ink fixing layer 120 contains salts that are calcium chloride or magnesium chloride. In yet some other examples, the ink fixing layer 120 contains salts that are calcium chloride.

The ink fixing layer 120 can contains an ink fixing agent. Said ink fixing agent can be an electrical charged compound. "Electrical charged" refers to a chemical substance with some atoms gaining or losing one or more electrons or protons, together with a complex ion that consists of an aggregate of atoms with opposite charge. The charged ion and associated complex ion can de-coupled in an aqueous environment. One example of such electrical charged compound is electrolyte, whether low molecular species or high molecular species. Examples of low molecular species electrolyte include inorganic salts, such as water-soluble and multi-valent charged salts. In other examples, the electrolytes are organic salt or water soluble organic acid salt.

In some examples, the ink fixing layer 120 contains an ink fixing agent which is a water-soluble high-valence metal complex. The water-soluble high-valence metal complex can be used in an amount representing from about 0.5 to about 50 parts, or from about 1 to about 1.5 parts by total dry weight of the ink fixing layer 120. Such water-soluble high-valence metal complex can be a water-soluble compound containing high-valence metallic ion, a water-soluble cationic high-valence metallic complex or a water-soluble cationic polymeric compound containing high-valence metallic ion. Water-soluble high-valence metallic ions can be high-valence metallic cation or anion. Suitable cation species can include one or more of Group II metals, Group III metals or transition metals from the period table, such as, for instance, calcium, copper, nickel, zinc, magnesium, barium, iron, aluminum and chromium ions. Anion species can include one or more of chloride, iodide, bromide, nitrate, sulfate, sulfite, phosphate, chlorate, and acetate.

In some examples, the water-soluble high-valence metal complex is a water-soluble aluminum salt. In some other examples, the water-soluble high-valence metal complex is a water-soluble trivalent aluminum salt. Examples of such salts include aluminum acetate, aluminum bromate, aluminum bromide and the hexa- and pentadecyl hydrates thereof, aluminum ammonium sulfate, aluminum sodium sulfate, aluminum chlorate, aluminum citrate, aluminum chloride and the hexahydrate thereof, aluminum fluoride, aluminum iodide and the hexahydrate thereof, aluminum lactate, aluminum nitrate, aluminum stearate, aluminum sulfate, aluminum tartrate, aluminum triformate, aluminum formoacetate and the hydrate. The water-soluble high-valence metal complex can be a water-soluble cationic high-valence metallic complex. Such water-soluble cationic high-valence metallic complex can be a charged complex ion derived from a metal complex with coordinate covalent bonds or dative covalent bonds. The coordination number is defined by the number of ligand(s) attached to the central metal ion, and may range from two to nine, or even more. The ligands can be small polar molecules, such as $H_2O$ and $NH_3$, or can be anions such as $Cl^-$, $OH^-$ and $S^{2-}$. Examples of water-soluble high-valence metal complexes include $[Al(H_2O)_6]^{3+}$, $[Al(H_2O)_3(OH)_3]$, $[Al(H_2O)_2(OH)_4]$, and $[Al(H_2O)_4(OH)_2]$. Other examples include potassium sulfate dodecahydrate or aluminum sulfate octadeca hydrate. Alternatively, the metal complex can include two or more central atoms, also referred to as polynuclear complexes, which can be formed when a ligand donates electron pairs to two or more metal ions simultaneously and then acts as bridge between the multiple central ions. In some examples, the charged complex ions can be octa-aqua-dioxodialuminim (iV)$^{4+}$, $Al_8(OH)_{20}^{4+}$ or $[Al_8(OH)_{10}(SO_4)_5]^{4+}$. The water-soluble high-valence metal complex can be a water-soluble cationic polymeric compound containing high-valence metallic ion. Examples of such cationic polymer include: poly-diallyl-dimethyl-ammonium chloride, poly-diallylamine, polyethylene imine, poly2-vinylpyridine, poly 4-vinylpyridine poly2-(tert-butylamino)ethyl methacrylate, poly 2-aminoethyl methacrylate hydrochloride, poly 4'-diamino-3,3'-dinitrodiphenyl poly N-(3-ether, aminopropyl)methacrylamide hydrochloride, poly 4,3,3'-diaminodiphenyl sulfone, poly 2-(iso-propylamino)ethyl styrene, poly2-(N,N-diethylamino)ethyl methacrylate, poly 2-(diethylamino) ethyl styrene, and 2-(N,N-dimethylamino)ethyl acrylate.

The ink fixing layer 120 may include also a pigment (e.g., calcined clay), ground calcium carbonate (GCC), a latex, an ink fixer agent (salt), and/or water. In some examples, the ink fixing layer further includes a dispersant. In some other examples, the ink fixing layer further includes a pigment. The pigment may be a calcined clay, kaolin clay, precipitated calcium carbonate (PCC), modified calcium carbonate (MCC), calcium sulfate, TiO2, talc, etc. The dispersant, if included, is to disperse the various components as well as contribute to the stability of the pre-coat fluid. Examples of suitable dispersants include polyacrylated salt and polycarboxylated salt. The latex may be one (or a mixture) that is compatible with the salt and the other pre-coat fluid ingredients, as well as being one that properly forms a film upon drying (to bind the pigment in the film). Examples of suitable latexes include polybutadiene latex, styrene-butadiene copolymer latex, acrylonitrile-butadiene-styrene terpolymer latex, polychloroprene latex, acrylic latex, polyester emulsions, acrylonitrile-butadiene latex, polyvinyl acetate, polyvinyl acetate copolymers (e.g., vinyl acetate—ethylene latex), and combinations thereof. Without being linked by any theory, it is believed that the ink fixing layer contains enough ink fixer agent, or salt, such as, e.g., CaCl2, to aid image quality (IQ), mainly, bleed, coalescence, and text quality. The ink fixing layer 120 may also include a pigment, such as a calcined clay, to assist in controlling the ink penetration and to enhance gloss of the printed image.

The Image Receiving Layer 130

The printable medium 100 includes also an image receiving layer 130. Said image receiving layer 130 is applied above the ink fixing layer 120 on the image side 101 of the printable medium. The image receiving layer 130 is considered as the top layer of the printable medium, as described herein, and is the surface where the ink composition is deposited. Such image receiving layer is configured to receive imaging material, such as, for example, an ink that is printed in the form of an image. The coat weight of the image receiving layer 130 may range, for example, from about 5 gsm to about 30 gsm or may ranges from about 10 gsm to about 20 gsm. Once coated, the image receiving composition dries to form a layer (i.e., the image receiving layer). In some examples, the thickness of the image receiving layer ranges from about 5 microns (μm) to about 40 microns (μm). In some examples, the image receiving layer 130 has a smooth surface with a PPS smoothness that is less than 1.5 micro (μm) or less than 0.8 micro (μm). It is believed that any surface with roughness greater than this range will results an undesirable image quality like mottling.

In some examples, the image receiving layer 130 contains pigment fillers and polymeric binders. The pigment fillers that are present in the image receiving layer 130 can be either inorganic and/or organic particulates, either in solids powder form or in a dispersed slurry form. Examples of inorganic pigment filler include, but are not limited to, aluminum silicate, kaolin clay, a calcium carbonate, silica, alumina, boehmite, mica, talc, and combinations or mixtures thereof. The inorganic pigment filler can include clay or a clay mixture. The inorganic pigment filler can include a calcium carbonate or a calcium carbonate mixture. The calcium carbonate may be one or more of ground calcium carbonate (GCC), precipitated calcium carbonate (PCC), modified GCC, and modified PCC. The inorganic pigment fillers may also include a mixture of a calcium carbonate and clay. In some examples, the inorganic pigment fillers include two different calcium carbonates pigments (e.g., GCC and PCC). Examples of organic pigment filler include, but are not limited to, particles, either existing in a dispersed slurry or in a solid powder, of polystyrene and its copolymers, polymethylacrylates and their copolymers, polyacrylates and their copolymers, polyolefins and their copolymers, such as polyethylene and polypropylene, a combination of two or more of the polymers. The pigments, for the image receiving layer 130, may be chosen from silica gel (e.g., Silojet®703C available from Grace Co.), modified (e.g., surface modified, chemically modified, etc.) calcium carbonate (e.g., Omyajet® B6606, C3301, and 5010, all of which are available from Omya, Inc.), precipitated calcium carbonate (e.g., Jetcoat®30 available from Specialty Minerals, Inc.), and combinations thereof. The pigments can be present in an amount ranging, for example, from about 65 wt % to about 85 wt % of the total wt % of the image receiving layer 130.

The polymeric binder, present in the image receiving layer 130, can be an aqueous based binder. Examples of suitable polymeric binders include polyvinyl alcohol, styrene-butadiene emulsion, acrylonitrile-butadiene latex, or any combinations. Moreover, in addition to the above binders, other aqueous binders can be added including: starch (including oxidized starch, cationized starch, esterified starch, enzymatically denatured starch and so on), gelatin, casein, soybean protein, cellulose derivatives including carboxy-methyl cellulose, hydroxyethyl cellulose and the like; acrylic emulsion, vinyl acetate emulsion, vinylidene chloride emulsion, polyester emulsion, and polyvinyl-pyrrolidone. Other examples of suitable polymeric binders include aqueous based binders such as polyvinyl alcohol (examples of which include Kuraray Poval®235, Mowiol®40-88; and Mowiol®20-98 available from Kuraray America, Inc.), styrene-butadiene emulsions, acrylonitrile-butadiene latex, and combinations thereof. The amount of the polymeric binder, that is present in the image receiving layer 130, can represents from about 5 to about 40 parts per 100 parts of pigment filler by dry weight; or can represent from about 10 to about 30 parts per 100 parts of pigment filler by dry weight.

The image receiving layer or composition can include a fixative or fixing agent. The fixing agent can chemically, physically, and/or electrostatically bind a marking material, such as an inkjet ink, at or near an outer surface of the coated print medium to provide acceptable water-fastness, smear-fastness, and overall image stability. A function of the fixatives is to reduce ink dry time. Examples of fixatives are metal salts, a cationic amine polymers, a quaternary ammonium salts, or a quaternary phosphonium salts. The metallic salt may be a water-soluble mono- or multi-valent metallic salt. The metallic salt may include cations, such as Group I metals, Group II metals, Group III metals, or transition metals, e.g., sodium, calcium, copper, nickel, magnesium, zinc, barium, iron, aluminum, or chromium ions. An anion species can be chloride, iodide, bromide, nitrate, sulfate, sulfite, phosphate, chlorate, acetate ions, or various combinations. In some examples, a single fixative can be used, or combinations of fixatives can be used, such as a metal salt admixed with the cationic amine polymer or one of the quaternary salts. The fixative agent can be present at from 1 wt % to 20 wt % in the coating layer (based on dry weight or solids of the coating composition), for example. In some examples, the image receiving layer or composition comprises a fixative or fixing agent which includes a metal salt, a cationic amine polymer, a quaternary ammonium salt, a quaternary phosphonium salt, or mixture thereof. In some other examples, the image receiving layer or composition comprises a fixative or fixing agent which is calcium chloride (CaCl2)). In yet some other examples, the image receiving layer or composition comprises a fixative or fixing agent which is calcium chloride (CaCl2) and that is present at a level which is below 2 parts per 100 parts of pigment in the coating.

The image receiving layer may further include other additives, e.g., processing aids and property modifiers. Examples of additives that may be incorporated include crosslinking agent, defoamer, fixing agent, and/or pH adjuster. The image receiving layer may also include a defoamer in an amount ranging from about 0.05 wt % to about 0.2 wt % of the total wt % of the image receiving layer. Examples of the defoamer include Foamaster® 1410, 1420, 1430, all of which are available from BASF Corp.

The Barrier Layer 140

The printable medium encompasses a supporting substrate 110, with an image-side 101 and a back side 102, and a barrier layer 140 that is directly applied on the supporting substrate 110, on the back side 102 of said printable medium (i.e. on the non-imaging side). The barrier layer 140 contains a flame-retardant agent. In some examples, the barrier layer 140 has a coat-weight in an amount representing from about 2 to about 30 gsm or representing from about of 5 to about 10 gsm.

The barrier layer 140 can contain a flame-retardant agent (or fire retardant) that is a phosphorus-containing compound or a nitrogen-containing compound. Phosphorus-containing compounds and nitrogen-containing compounds can be used individually or in combination, or can include compounds that comprise any combination of a phosphorus and nitrogen. Nitrogen-containing compounds, that can be used herein, include melamines (including melamine derivatives) such as melamine, melamine cyanurate, melamine polyphosphate, melem, and melon. Phosphorus-containing compounds include organic and inorganic phosphates, phosphonates, organophosphates and/or phoshpinates compounds with different oxidation states. In some examples, an organophosphate can be used as a flame-retardant agent. Such organophosphate compounds include aliphatic phosphates, phosphonates and aromatic phosphonates compounds. The organophosphate compound can be an organo-phosphonate with four oxygen atoms attached to the central phosphorus; an aliphatic, aromatic, or polymeric organo-phosphate with 3 oxygen atoms attached to the central phosphorus, or an organo-phosphinate with 2 oxygen atoms attached to the central phosphorus atom. The liquid fire retardant, or water-soluble flame retardant, can be water-soluble phosphorus-containing compounds. Example of water-soluble phosphorus-containing compound is a phosphonate ester with a phosphorus-containing closed 4- to 6-membered ring structure. An example of such a compound is 5-ethyl-2-methyl-1,3,2-dioxaphosphorinan-5-yl)methyl dimethyl phosphonate P-oxide. Another example is bis[(5-ethyl-2-methyl-1,3,2-dioxaphosphorinan-5-yl)methyl] methyl phosphonate P,P'-dioxide.

Examples of commercially available products, include FR-102® (available from Shanghai Xusen Co Ltd) or Aflammit®-PE and Aflammit®-MSG (both available from Thor). Other examples of flame retardant agents include commercial available products such as Exolit® AP compounds (available from Clariant), Aflammit® compounds (available from Thor), Disflamoll® DPK (available from Lanxess), or Phoslite B compounds (available from Italmatch Chemicals).

In some examples, the barrier layer 140 is directly built on the surface of the non-woven base composite supporting substrate 110. The substrate can be soaked in a bath containing liquid flame retardant solution or containing a water-soluble flame retardant solution, for examples, and the excess can be rolled out. More specifically, impregnated substrates (prepared by bath, spraying, dipping, etc.) can be passed through padding nip rolls under pressure to provide a dry barrel layer with flame retardancy having a coat weight in the range of from about 0.5 to about 50 gsm, though this range is not limiting. The impregnated substrate, after nip rolling, can then be dried with peak web temperature in the range of about 90° C. to about 250° C.

The barrier layer 140 may also contain polymeric latex. Such polymeric latex can be polyurethane based latex which is able form a continuous film in which the particles of phosphorus-containing compounds and nitrogen-containing compounds are embedded inside. Further, the barrel layer with flame retardancy may also contain a particle filler or combination of fillers. The fillers can be either inflammable inorganic particles such as calcium carbonate powder, china clay powder and titanium dioxide powder, or flame retardancy powder such as aluminum hydroxide powder and magnesium hydroxide powder.

In some examples, the barrier layers are resin-rich pigment coating layers that reduce the penetration of exterior moisture into the substrate. The barrier layer can thus include one or more types of pigment particles and polymer resin binder. The term "resin-rich" refers to compositions in which larger proportions of polymer resin components are included than are needed to bind the pigment particles to each other and the barrier layer to the underlying substrate, which can be in the range of 5-20% by weight of total coating amount. For example, a resin-rich barrier layer may include polymer resins in amounts that are at least 30% by weight of the total pigment fillers. In one example, the barrier layer includes 60 to 80% resins by total weight of barrier layer.

A wide variety of resin compositions which can be used in the barrier layer. For example, the resin compositions may include, but are not limited to, resins formed by polymerization of hydrophobic addition monomers. Examples of hydrophobic addition monomers include, but are not limited to, C1-C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxy-ethylacrylate, hydroxyethyl-methacrylate), carboxylica containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinyl-versatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido)methylene), and combinations thereof. In particular, polymers made from the polymerization and/or copolymerization of alkyl acrylate, alkyl methacrylate, vinyl esters, and styrene derivatives may be useful. The polymers can be made using a wide variety of polymerization methods. For example, the polymers may be made using bulk polymerization, solution polymerization, emulsion polymerization, or other suitable methods. In one implementation, the emulsion polymerization in the presence of aqueous solvent such as water may be useful in making the polymer resins described above. In one example, the polymer latex resin was made using emulsion polymerization with a particle size ranging from 0.1 to 5 micrometers. The range of particles sizes can be narrower in some implementations. For example, the particle size may range from 0.5 to 3 micrometers. The glass transition temperature, Tg, of polymer resin can be another factor that influences the desired performance. The glass transition temperature of the polymer resin can be in the range of from about 20 to about 50° C.

The Printed Material 200

The present disclosure relates also to a printed material 200 that encompasses the printable recording medium 100 as described above, a printed image (210) applied on the image side 101 of the printable recording medium, i.e. over the image receiving layer 130, and an overcoat layer (220) applied over the printed image (210). In more details, the printed material comprises a printable medium with a nonwoven base composite supporting substrate; at least two coating layers, on the image side of the composite supporting substrate, that include: an ink fixing layer, directly applied upon the supporting substrate, comprising a salt; and an image receiving layer, applied over the ink fixing layer, including pigment fillers and polymeric binders; and a barrier layer, containing a flame-retardant agent, applied on the backside of the composite supporting substrate; a printed image; and an overcoat layer composition, applied over the printed image, at a coat weight ranging from about 0.1 to about 5 gsm. In some examples, the printed material 200 of the present disclosure is a printed wall cover material.

The overcoat layer or varnish layer (220) is applied over the printed image, that has been applied on the image side 101 of the printable recording medium, over the image receiving layer 130, at a coat-weight ranging from about 0.1 to about 5 gsm or representing from about of 0.2 to about 2 gsm.

The overcoat layer or varnish layer (220) can be applied on-line with web press image printing or offline coating process separated with web press printer. In some examples, the overcoat layer or varnish layer (220) comprises high molecular weight polymer and a wax. It is believed that the polymer and the wax help to control surface COF (Coefficient of Friction) and improve scratch resistance. Any polymer which can form a transparent film at room temperature in one example, or at elevated temperature at 40-150° C. can be selected as the polymer of the overcoat layer polymer. Example of the polymer include, but not limited to, C1-C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, tolyl methacrylate, p-tolyl methacrylate, benzyl methacrylate), hydroxyl containing monomers (e.g., hydroxy-ethylacrylate, hydroxy-ethyl-methacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinyl versatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido)methylene), and combinations thereof. Polymers made from the polymerization and/or copolymerization of alkyl acrylate, alkyl methacrylate, vinyl esters, and styrene derivatives may also be useful. Examples of the commercial available polymers are, but not limited to, Joncryl® 130, Joncryl® 138, Joncryl® 680, Joncryl® 89, Joncryl® 98, Joncryl® 58, Joncryl® 678, Joncryl® 77, Neocryrl® A-5025, and Neocryl® A-639.

In some examples, the wax that can be used in the overcoat include, but not limited to, dispersed polymeric particles such as poly-alkene particles. In some other examples, the wax is a poly-alkene particle. The poly-alkene is meant that the polymeric particle is made, for instance, from a poly-alkene homopolymer, a poly-alkene copolymer, a modified poly-alkene, a combination of two or more of poly-alkenes, or a mixture of two or more thereof. By definition, a "poly-alkene" herein refers to a polymeric material formed via polymerization of an alkene monomer, i.e., CnH2n and its derivatives, where n is within a range of about 7,000 to about 20,000. Examples of the polymers used to make the polymeric particles include, but are not limited to, polyethylene homopolymer, polypropylene homopolymer, polytetrafluoroethylene (PTFE), polyimide, amide-modified polyethylene, amide-modified polypropylene, PTFE-modified polyethylene, PTFE-modified polypropylene, maleic anhydride-modified polyethylene, maleic anhydride-modified polypropylene, oxidized polyethylene, oxidized polypropylene, chloride polyethylene, chloride polypropylene, a combination of two or more of the above-listed poly-alkenes, or a mixture of two or more of the above-listed poly-alkenes. The polymeric particles can have a hardness value less than about 2 dmm (diameter in mm), as measured by ASTM D-5 method. In some other examples, the particles have a hardness value less than about 1, or less than about 0.5 dmm. In some examples, the particle size of the polymeric particles can be in the range of about 10 to about 40 μm. In some examples, the particles have a hardness value in dmm within a range of about 0.1 to about 2, or about 0.1 to about 1.5.

In some examples, the polymeric particles are polytetrafluoroethylene (PTFE), polyamide or polyethylene polymer particles. In some other examples, the polymeric particles are polytetrafluoroethylene (PTFE), polyamide or polyethylene polymer particles and have an average particle size be in the range of about 10 to about 60 μm. In yet some other examples, the polymeric particles are polyamide polymer particles. The polymeric particles can thus be polyamide particles that have a Vicat softening point ranging from about 100° C. to about 180° C., as measured by the Industrial standard ASTM D1525, and have a melting point ranging from about 100° C. to about 220° C., as measured by the industrial standard ISO3146.

The overcoat layer can further include the components which can improved the matt-ness or opacity of the overcoat. Examples of such components include titanium dioxide and silica such as fumed silica and/or silica gel. The commercial matting agent such as Acematt®, Syloid® Matting Agents and OpTiMat® Matting Agents can be also used.

Method for Forming a Printable Medium Substrate

In some examples, a method for forming a printable medium 300 with a non-woven base composite supporting substrate 110 having, on its image side 101, an ink fixing layer 120 and an image receiving layer 130, and having, on its back-side 102 a barrier layer 140 is provided. Such printable medium could be a wall-covering medium. FIG. 3 is a flowchart illustrating a method of making the recording medium such as described herein. Such method encompasses providing 310 a non-woven base composite supporting substrate 110; forming 320 an ink fixing layer 120 on the image side 101 of the printable medium; applying 330 an image receiving layer 130 over said ink fixing layer 120; and applying 440 a barrier layer 140 on the back-side 101 of the medium.

The method for producing a printable medium includes making the supporting substrate, using a fourdrinier type paper machine, and, then, applying an ink fixing layer 120 using either an on-line size press or an off-line coater known in the arts over said substrate. The method further encompasses coating an image receiving layer 130, onto an image side 101 of the composite structure, over the ink fixing layer 120. The image receiving layer 130 is applied by any coating method. The coating methods may include, but are not limited to blade coating processes, rod coating processes, air-knife coating processes, curtain coating processes, slot coating processes, jet coating processing or any combination thereof. The image receiving layer 130 can be dried by any suitable means, including, but not limited to, convection, conduction, infrared radiation, atmospheric exposure, or other known method.

A calendering process can then be used to achieve the desired gloss or surface smoothness. Calendering is the process of smoothing the surface of the paper by pressing it between nips formed in a pair of rollers. The rollers can be metal hard roll, and soft roll covered with a resilient cover, such as a polymer roll. The resilient-surface roll adapts itself to the contours of the surface of the substrate and presses the opposite side of substrate evenly against the smooth-surface press roll. Any calendering devices and methods can be used. The calendering device can be a separate super-calendering machine, an on-line calendaring unit, an off-line soft nip calendaring machine, or the like. In some examples, the calendering is carried out at a temperature ranging from about 50 to about 150° C. (metal roll surface temperature) and, in some other examples, from about 80 to about 110° C. The nip pressure can be any value between about 100 to about 500 KN/cm2.

In some examples, the barrier layer 140 is applied on the back-side 101 non-woven base composite supporting substrate 110. In some examples, the barrier layer 140 can also be applied to the printable medium, using a coating processing. The coating techniques, that can be used, are not limited to blade coating processes, rod coating processes, air-knife coating processes, curtain coating processes, slot coating processes, jet coating processing or any combination thereof.

In some examples, the back-side 102 (or non-image side) of the printable medium 100, specifically when used as a wall-covering medium, can be pre-applied with an adhesive for adhering to a wall or other surfaces. In some other examples, the printable medium 100 can be applied on a wall, as a wall-covering, using a commercial available adhesive. Examples of commercial wall-adhering adhesives for wall-coverings include, but are not limited to, Pro-880 Premium Clear Strippable, Pro-838 Heavy Duty Clear, Pro-543 Universal, ECO-888 Strippable with Mildew Guard, and Golden Harvest Wheat wallpaper adhesives, all from Roman Decorating Products, IL, USA; Zinsser® Sure Grip®-128 and Zinsser Sure Grip®-132 wallpaper adhesives, both from Rust-Oleum® Corporation, USA; Dynamite® 234, Dynamite® C-11, Dynamite® DEFENDER wallpaper adhesives, each by Gardner-Gibson, FL, USA; Polycell® Paste the Wall wallpaper adhesive from AkzoNobel Group of Companies, UK; ECOFIX adhesive from Ecofix AB, Sweden; and Metylan and Solvite wallpaper adhesives from Henkel, Germany.

Printing Method

In some examples, a printing method 400 is provided herein. The printed method described herein is also a method for making the printed material 200 as described above. FIG. 4 is a flowchart illustrating a printing method 400 comprising providing 410 a printable medium such as defined herein, applying an ink composition onto said printable medium to form a printed image 420; applying an over print durable overcoat layer applied over the printed image at a coat weight ranging from about 0.1 to about 5 gsm 430 and then obtaining the printed material 440.

The printing method encompasses providing a printable medium with a non-woven base composite supporting substrate; at least two coating layers, on the image side of the composite supporting substrate, that include: an ink fixing layer, directly applied upon the supporting substrate, comprising a salt; and an image receiving layer, applied over the ink fixing layer, including pigment fillers and polymeric binders; and a barrier layer, containing a flame-retardant agent, applied on the backside of the composite supporting substrate; applying an ink composition onto said printable medium to form a printed image and applying an overcoat layer composition, over the printed image, at a coat weight ranging from about 0.1 to about 5 gsm.

The printed image will have, for examples, enhanced image quality and image permanence. The printable medium, as disclosed herein, may be used as a wall-covering material (e.g., wallpaper) for home or commercial use, for decoration or display. The printable medium can thus be a printable wall-covering medium. The printable medium is specifically designed to receive any inkjet printable ink, such as, for example, organic solvent-based inkjet inks or aqueous-based inkjet inks. The ink composition forms an image on the image side of the printable medium or on the image side of wall-covering medium.

The ink composition may be deposited, established, or printed on the printable medium using any suitable printing device. In some examples, the ink composition is applied to the printable medium via inkjet printing techniques. The ink may be deposited, established, or printed on the medium via continuous inkjet printing or via drop-on-demand inkjet printing, which includes thermal inkjet printing and piezo-electric inkjet printing. Representative examples of printers used to print on the printable medium or wall-covering medium, as defined herein, include, but are not limited to, HP PWP T230, T300, T400, T1100 high speed digital from HP Inc. The printers may be used in a standard wall paper profile with a production print mode or a normal print mode. The print mode may vary the ink application within a range of from about 50% to about 250% of each other.

In some examples, the ink composition is an inkjet ink composition and contains one or more colorants that impart the desired color to the printed message. As used herein, "colorant" includes dyes, pigments, and/or other particulates that may be suspended or dissolved in an ink vehicle. The colorant can be present in the ink composition in an amount required to produce the desired contrast and readability. In some other examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

In some other examples, the ink composition that is applied to print medium is an ink composition containing latex components. Latex components are, for examples, polymeric latex particulates. Therefore, in some examples, the ink composition contains polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, or amphoteric polymeric latex. Monomers that are often used to make synthetic latexes include ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate. In some examples, the latexes are prepared by latex emulsion polymerization and have a weight average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

EXAMPLES

The raw materials and the chemical components used in making illustrating samples are listed in Table 1.

TABLE 1

| Ingredients | Nature of the ingredients | Supplier |
|---|---|---|
| Hydrocarb ®60 | Calcium carbonate pigment | Omya North America |
| Hydrocarb ®90 | Calcium carbonate pigment | Omya North America |
| Opacarb ® A40 | precipitated calcium carbonate | Specialty Minerals Inc. |
| Kamintex ® | Calcite clay | KaMin LLC |
| Latex XU31258.50 | Latex | Trinso |
| Litex ® PX9740 | Latex | Synthomer |
| Omyajet ® 5020 | Modified calcium carbonate | Omya Inc. |
| Joncryl ®98 | Acrylic resin | BASF |
| Jonwax 28 ® | Polyethylene wax emulsion | BASF |
| Silwet ® L7600 | Silicone-polyether | Momentive Inc. |
| Disponil ® AFX 4030 | Modified fatty alcohol poly-glycolether | BASF |
| Mowiol ® 6-98 | Polyvinyl alcohol | Sigma Aldrich |
| Ropaque ® AF1055 | Plastic Pigment | Dow Chemical |
| calcium chloride (CaCl$_2$) | Ink fixer | General Chem. |
| Wax Ultralube ®E846 | Thermo-plastic Materials | Keim Additec Surface |
| SpaceRite ® S3 | Flamme retardant - Aluminum tri-hydroxide | J. M. Huber Corp. |
| Aflammit ®TL 1313 | Flame retardant | Thor |

Example 1—Preparation of Printable Medium Samples

The illustrating media sample 1 is print medium in accordance with the principles described herein. The media sample 2 is a comparative example. Detailed structures of these samples are shown in Table 2 below. The media samples are wall-covering print medium. Each sample has a non-woven supporting substrate 110 that includes about 15 wt % polyethylene terephthalate (PET) fibers, about 5 wt % calcium carbonate, binder present in a ratio of 10:100 binder/PET fibers, and about 80 wt % mixture of hard and soft wood fibers. The binder in the non-woven paper layer is a mixture of acrylic latex and styrene-acrylic latex in a ratio of 70:30. Samples 1 and 2 include an ink fixing layer 120 and image receiving layer 130 on the image receiving side of the supporting substrate 110 and a barrier layer 140 applied on the opposing side of the image receiving layer (hack-side) of the supporting substrate 110. The different formulations of different layer are illustrated in the tables 3, 4 and 5. All amounts are expressed in Parts by dry weight.

TABLE 2

| Media structures | Example 1 | Example 2 (Comparative) |
|---|---|---|
| Image receiving layer 130 | 20 gsm, formula B1 | 20 gsm, formula B1 |
| Ink fixing layer 120 | 10 gsm, formula A1 | 10 gsm, formula A2 |
| Non-woven supporting substrate 110 | 150 gsm | 150 gsm |
| Barrier layer 140 | 8 gsm, formula C2 | 8 gsm, formula C2 |

TABLE 3

| Ingredient | A1 | A2 (comparison) |
|---|---|---|
| Hydrocarb ® 60 | 100 | 60 |
| Kamintex ® | — | 40 |
| CaCl$_2$ | 5 | — |
| Mowiol ® 6-98 | 4.5 | 4.5 |
| Litex ® PX9740 | 7 | 7 |
| Disponil ® AFX 3070 | 0.2 | — |

Ink fixing layer 120

TABLE 4

| Ingredient | B1 | B2 |
|---|---|---|
| Ropaque ® AF1055 | 5 | — |
| Hydrocarb ® 90 | 60 | 90 |
| Kamintex ® | 40 | 10 |
| CaCl$_2$ | — | 2 |
| PVA 6-98 | 2 | 4 |
| Litex PX9550 | 7 | 7 |
| Wax Ultralube ®E846 | 2 | 2 |
| Silwet ® L7600 | 0.2 | 0.2 |

Ink receiving layer 130

TABLE 5

| Ingredient | C1 | C2 |
|---|---|---|
| Hydrocarb ® 60 | 100 | 60 |
| Kamintex ® | — | 40 |
| Spacerite ® 3 | 10 | 5 |
| Aflammit ® | — | 5 |
| Moviol ® 6-98 | 1 | 1 |
| Litex ® PX9550 | 15 | 15 |

Barrier layer 140

Example 2—Printed Media Performances

The same images are printed on the experimental Sample 1 and Comparison Samples 2. The samples are printed with an HP CM8060 MFP Edgeline® printer, from HP Inc, using HP A50 pigment inks (i.e., aqueous inkjet ink). The printing process involves 2 passes and six dry spin conditions to mimic high-speed, digital, webpress inkjet printing. An overcoat layer composition (250) is applied on the printed samples 1 and 2, over the printed image, using mayor rod equipment, at a coat weight of about 2 gsm. The formulation of the overcoat layer is illustrated in the Table 6 below. The amounts are expressed in Parts by dry weight.

TABLE 6

| Ingredient | Overcoat layer (250) |
|---|---|
| Joncryl ® 98 | 85 |
| Jonwax ® | 5 |
| Silwet ® L7600 | 2 |
| Acematt ® TS 100 | 8 |

The printed mediums are then evaluated for different performances: image quality (bleed, KOD, Gamut, L*min), image durability and gloss. The results of these tests are expressed in the Table 7 below.

The Color Gamut measures the volume of color space enclosed inside the achievable colors. Color gamut is estimated from an eight-color model using Black, White, Red, Green, Blue, Cyan, Magenta and Yellow tiles, Spectro-densitometer Model 938, supplied by X-rite, is used as the instrument to measure it. A higher score means a better performance.

L*min value testing is carried out on a black printed area and is measured with an X-RITE®939 Spectro-densitometer, using D65 illuminant and second observer angle. This measure determines how "black" the black color is. A lower score indicates a better performance.

The KOD measures the black optical density of black areas fill. The KOD is measured by Spectro-densitometer Model 938 supplied by X-rite. A higher score means a better performance.

The Bleed is the highest distance that color bleeds from one color into another in adjacent tiles. A lower score means a better performance. The measurement is done on Personal Image Analysis System provided by Quality Engineering Associates (QEA). Bleed testing is carried out with a bleed stinger pattern. 1016 micron lines (or 40 mil, where 1 mil=$1/1000^{th}$ of an inch) of cyan, magenta, yellow, black, red, green, blue inks, passing through solid area fills of each color, are printed and scanned. The result is reported as an average from 6 measurements.

Coalescence is the tendency of wet ink on the media surface to separate into areas of high and low concentration of colorant. The printed media appears "mottled" or non-uniform in print density. Coalescence can be quantified using a mottle measurement method described in ISO-13660. The method divides the measurement area into many small square cells and computes the variation in reflectance or density in those cells. Smaller numbers indicate less variation, and better performance. Personal Image Analysis System provided by Quality Engineering Associates (QEA) has been used to measure the coalescence.

The Gloss test measures how much light is reflected with 75-degree geometry on a printed media. 75° Sheet Gloss testing is carried out by Gloss measurement of the unprinted area of the sheet with a BYK-Gardner MICRO-GLOSS® 75° Meter (BYK-Gardner USA). The higher the score is, the better the performance of the media is.

The Durability test, in accordance with ASTM D-5264, is performed by exposing the various Samples to be tested with a SUTHERLAND® Ink Rub tester with 2 lb weigh and 5 cycles. It is designed to evaluate the scuffing or rubbing resistance of the printed or coated surface of paper, paperboard, film and other materials. The SUTHERLAND® Ink Rub tester features a digital counter with a fiber optic sensor for accuracy and is compatible with the requirements of the ASTM D-5264 test method. The "visual difference" in the printed surface are visually rated score equal or below 3 considered fail). If there is no visual damage, then the sample receives score of 5.

TABLE 7

| Sample ID | KOD | Bleed (mill) | QEA Coalescence (blue color) | Color Gamut | L*min | Image Gloss (black) | Durability Red color |
|---|---|---|---|---|---|---|---|
| Sample 1 | 2.12 | 3.2 | 5.7 | 311400 | 8.2 | 75 | 5 |
| Sample 2 (comparative) | 2.02 | 30.2 | 19 | 326108 | 8.0 | 71 | 5 |

The invention claimed is:

1. A printable medium with:
  a. a non-woven base composite supporting substrate having an image side and a backside;
  b. at least two coating layers, on the image side of the composite supporting substrate, including:
    i. an ink fixing layer, directly applied upon the supporting substrate, comprising a salt and a pigment;
    ii. and an image receiving layer, applied over the ink fixing layer, including pigment fillers and polymeric binders;
  c. and a barrier layer, containing a flame-retardant agent and from 60 wt % to 80 wt % resin, directly applied on the backside of the composite supporting substrate without an intervening layer between the composite supporting substrate and the barrier layer.

2. The printable medium of claim 1 wherein the printable medium is a wall-covering medium.

3. The printable medium of claim 1 wherein the non-woven base composite supporting substrate includes a synthetic polymeric fiber as a first constituent material and a natural fiber as a second constituent material.

4. The printable medium of claim 1 wherein the non-woven base composite supporting substrate further includes a polymeric binder.

5. The printable medium of claim 1 wherein the ink fixing layer includes calcium chloride.

6. The printable medium of claim 1 wherein the ink fixing layer further includes an ink fixing agent which is an electrical charged compound.

7. The printable medium of claim 1 wherein a coat weight of the ink fixing layer is within a range of about 0.1 gsm to about 25 gsm.

8. The printable medium of claim 1 wherein the image receiving layer further includes a fixative agent, wherein the fixative agent includes a metal salt, a cationic amine polymer, a quaternary ammonium salt, a quaternary phosphonium salt, or a mixture thereof.

9. The printable medium of claim 1 wherein a coat weight of the image receiving layer is within a range of about 5 gsm to about 30 gsm.

10. The printable medium of claim 1 wherein the flame-retardant agent of the barrier layer is a phosphorus-containing compound or a nitrogen-containing compound.

11. A printed material comprising
  a. a printable medium with a non-woven base composite supporting substrate having an image side and a backside;
    at least two coating layers, on the image side of the composite supporting substrate, including:
      an ink fixing layer, directly applied upon the supporting substrate, comprising a salt and a pigment; and
      an image receiving layer, applied over the ink fixing layer, including pigment fillers and polymeric binders; and
      a barrier layer, containing a flame-retardant agent and from 60 wt % to 80 wt % resin, directly applied on the backside of the composite supporting substrate without an intervening layer between the composite supporting substrate and the barrier layer:
  b. a printed image;
  c. and an overcoat layer composition, applied over the printed image, at a coat weight ranging from about 0.1 gsm to about 5 gsm.

12. The printed material of claim 11 wherein the overcoat layer composition comprises a high molecular weight polymer and a wax.

13. A printing method comprising:
   a. providing a printable medium with a non-woven base composite supporting substrate having an image side and a backside; at least two coating layers, on the image side of the composite supporting substrate including: an ink fixing layer, directly applied upon the supporting substrate, comprising a salt and a pigment; and an image receiving layer, applied over the ink fixing layer, including pigment fillers and polymeric binders; and a barrier layer, containing a flame-retardant agent and 60 wt % to 80 wt % resin, directly applied on the backside of the composite supporting substrate without an intervening layer between the composite supporting substrate and the barrier layer;
   b. applying an ink composition onto said printable medium to form a printed image;
   c. and applying an overcoat layer composition, over the printed image, at a coat weight ranging from about 0.1 gsm to about 5 gsm.

14. The printing method of claim 13 wherein the ink composition is applied to the printable medium via inkjet printing techniques.

15. The printable medium of claim 1 wherein the image receiving layer further includes a fixative agent, wherein the fixative agent includes a calcium chloride and the calcium chloride is present at from 2 parts to 100 parts below an amount of the pigment filler in the fixative agent.

16. The printable medium of claim 1 wherein the barrier layer further includes pigment particles and polymer resin binder.

17. The printable medium of claim 1 wherein the salt of the ink fixing layer is a water soluble organic acid salt.

18. The printable medium of claim 1 wherein the ink fixing layer further includes a water-soluble high-valence metal complex and the water-soluble high-valence metal complex is selected from aluminum acetate, aluminum bromate, aluminum bromide, aluminum ammonium sulfate, aluminum sodium sulfate, aluminum chlorate, aluminum citrate, aluminum chloride, aluminum fluoride, aluminum iodide, aluminum lactate, aluminum nitrate, aluminum stearate, aluminum sulfate, aluminum tartrate, aluminum triformate, or aluminum formo-acetate.

19. The printable medium of claim 1 wherein the pigment is selected from calcined clay, kaolin clay, precipitated calcium carbonate (PCC), modified calcium carbonate (MCC), calcium sulfate, $TiO_2$, or talc.

20. The printable medium of claim 1 wherein the barrier layer further includes a polymeric latex and the polymeric latex forms a continuous film which coats the flame retardant.

* * * * *